United States Patent [19]

Bernardini

[11] Patent Number: 4,711,520

[45] Date of Patent: Dec. 8, 1987

[54] FIBER OPTIC CONNECTOR BACKSHELL

[75] Inventor: Allen J. Bernardini, Southbury, Conn.

[73] Assignee: Litton Systems, Inc., Watertown, Conn.

[21] Appl. No.: 751,204

[22] Filed: Jul. 2, 1985

[51] Int. Cl.[4] ............................................. G02B 6/36
[52] U.S. Cl. ................................ 350/96.20; 350/96.21; 350/96.22
[58] Field of Search ............... 350/96.10, 96.15, 96.20, 350/96.21, 96.22, 96.23

[56] References Cited

U.S. PATENT DOCUMENTS

| 4,458,984 | 7/1984 | Roberts et al. | 350/96.21 |
|---|---|---|---|
| 4,595,256 | 6/1986 | Guazzo | 350/96.21 |
| 4,595,839 | 6/1986 | Braun et al. | 350/96.20 X |
| 4,601,536 | 7/1986 | Guazzo | 350/96.20 |
| 4,664,471 | 5/1987 | Mignien et al. | 350/96.21 |

Primary Examiner—William L. Sikes
Assistant Examiner—Brian M. Healy
Attorney, Agent, or Firm—Brian L. Ribando

[57] ABSTRACT

A fiber optic connector backshell surrounds and protects one or more fiber optic pairs which are joined together by fiber optic couplers. The backshell includes a cylindrical body and a sleeve. A clamp seals and secures the body to the outer jacket of a fiber optic cable and an integral frame includes struts which surround access windows and provide a strain relief. The fiber optic pairs and couplers are exposed when said sleeve is removed from the cylindrical body.

4 Claims, 1 Drawing Figure

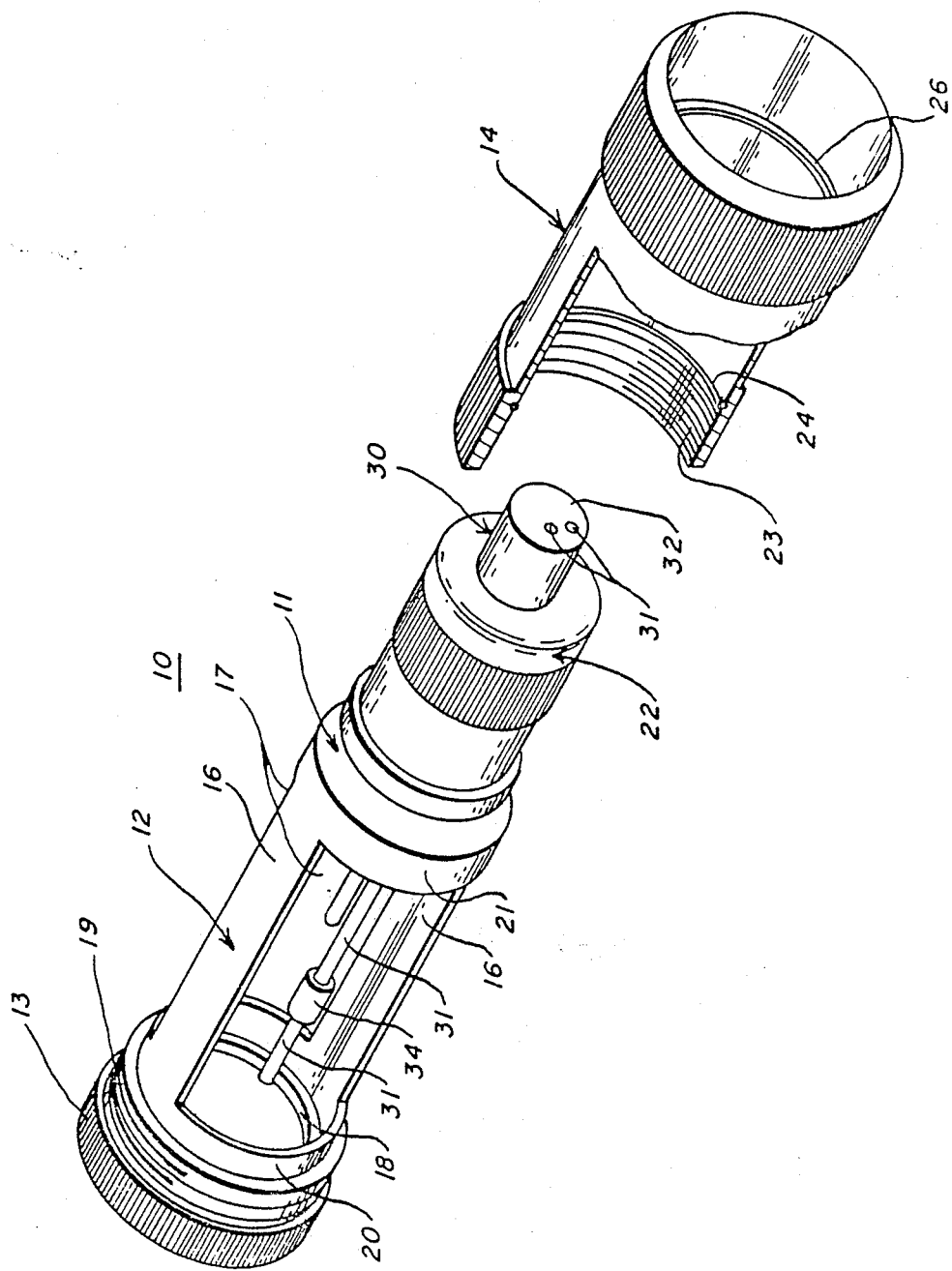

FIBER OPTIC CONNECTOR BACKSHELL

BACKGROUND OF THE INVENTION

This invention relates to a fiber optic connector backshell which is field maintainable.

During the assembly of a multi-channel fiber optic connector, it is customary to provide a small coil or loop of fiber optic material within the connector backshell for possible future repairs or changes. Because the fibers and the fiber contacts are relatively fragile, a connector backshell is designed to prevent relative movement of the individual optic fibers, and to act as a strain relief for the entire assembly. These functions are provided in part by clamping and sealing the backshell to strain members within the cable or to the outer jacket of the fiber bundle, and by fabricating the backshell from a rigid material such as metal.

When changes or repairs are required to be made, the clamp and sealing mechanism of the backshell must be loosened. The backshell is then slid back up along the fiber bundle in order to provide access to the optic fibers and the contacts. This destroys all sealing and strain relief functions provided by the backshell. With the backshell disengaged, all of the fibers flap free, possibly disturbing the contacts and upsetting their alignment. Additionally, the loose fibers are subject to entanglement and damage.

SUMMARY AND OBJECTS OF THE INVENTION

According to the invention, a two piece field maintainable fiber optic backshell comprises a frame and a surrounding cover. The cover may be displaced allowing access to individual optic fibers and to their respective contacts. Although such access and the structure of the backshell allows the connections to be inspected, repaired, or replaced, the frame prevents unrestricted movement of the optic fibers and provides a strain relief mechanism.

It is therefore an object of the invention to provide a two piece field maintainable fiber optic connector backshell.

It is another object of the invention to provide a two piece field maintainable fiber optic connector backshell in which a portion of the backshell may be separated from the other portion allowing access to the optic fibers and the contacts located therein.

These and other objects of the invention will become apparent from the following detailed description, in which reference numerals used throughout the description designate like or corresponding parts on the drawing figures.

BRIEF DESCRIPTION OF THE DRAWINGS

The sole FIGURE is an exploded perspective view partly in section showing the fiber optic connector backshell according to the invention.

DESCRIPTION OF THE PREFERRED EMBODIMENT

Turning now to the drawing FIGURE, a two piece fiber optic connector backshell is generally designated by the reference numeral 10. The backshell comprises a body 11 and a cylindrical sleeve 14. The body 11 includes a frame portion 12 and a knurled coupling ring 13. The frame portion 12 comprises two opposed longitudinal struts 16 which frame two opposed windows 17.

The coupling ring 13 is internally threaded at 18 for attachment to an adjacent structure (not shown). Behind the knurled coupling ring 13 is a threaded portion 19 and a first cylindrical seat 20. A second cylindrical seat 21 is located at the end of the windows 17 which is opposite the first seat 20. A cable clamp 22 is mounted on the end of the connector backshell which is opposite the coupling ring 13.

The second part of the connector backshell comprises the cylindrical sleeve 14. The sleeve 14 is threaded at a forward end 23 so as to be mateable with the threads 19 adjacent the coupling ring 13. A first O-ring 24 is located within the sleeve adjacent the threaded section 23, and a second O-ring 26 is located within the sleeve adjacent the other end of the sleeve 14.

The connector backshell 10 is adapted to be used with a fiber optic cable 30. The optic cable 30 comprises a plurality of optic fibers 31 and is sheathed by an outer jacket 32. Pairs of optic fibers 31 are coupled together by means of fiber optic couplers 34.

MODE OF OPERATION OF THE PREFERRED EMBODIMENT

During initial assembly of the connector, the pairs of optic fibers 31 may be coupled together by means of the fiber optic couplers 34 in the usual way. Thereafter, the backshell body 11 may be secured to an adjacent casing or cable structure by the internal threads 18 located adjacent the coupling ring 13, and the cable clamp 22 is used and to clamp and seal the body 11 to the outer jacket 32 of the cable. The backshell sleeve 14 is attached to the body 11 by means of the mating threads 19 and 23, and the O-rings 24 and 26 seal against the seats 20 and 21, respectfully. The O-ring seals 24 and 26, since they are located on either end of the window 17, prevent the entry of moisture and other contaminants into the area of the backshell containing the fiber optic couplers 34.

In the event that it is required to gain access to the connectors or the cables within the fiber optic backshell, the sleeve 14 may be removed by unscrewing the sleeve from the body 11, sliding the sleeve 14 off of the body 11, and backing the sleeve up the cable 30. This operation exposes the two windows 17 which allow ample room in order to service the optic fiber pairs 33 and optic fiber couplers 34 contained within and in actual practice, the two windows 17 provide at least 240° of open space around the cylindrical body 11. It will be appreciated that since the backshell body 11 remains clamped to the cable 30 by the cable clamp 22, the frame portion 12 of the body 11 provides strain relief support for the optic fiber pairs and the couplers 34 during a repair operation. Additionally, the integrity of the body 11 prevents the optic fiber pairs becoming entangled or angularly displaced during an inspection or repair procedure.

Having thus described the invention, various modifications and alterations will occur to those skilled in the art, which alterations and modifications are intended to be within the scope of the invention as defined by the appended claims.

What is claimed is:

1. A field repairable fiber optic connector backshell for surrounding and protecting one or more fiber optic pairs which are joined together by fiber optic couplers, said backshell comprising:

a cylindrical body, a coupling ring on a first end of the cylindrical body having means for coupling said backshell to an adjacent member, a cable clamp on a second end of the cylindrical body for clamping and sealing the backshell to the outer jacket of a fiber optic cable, an integral frame joining the first end of the cylindrical body to the second end of the cylindrical body, a pair of opposed longitudinal struts comprising said frame, a pair of windows defined by the struts, wherein access to the fiber optic pairs and the fiber optic couplers is provided by said windows, a removable sleeve surrounding the frame portion and means for removably attaching the removable sleeve to the cylindrical body, seating surfaces on the cylindrical body on opposite ends of the windows, and sealing means on the first end and on the second end of the removable sleeve for mating with and sealing against said seating surfaces, whereby said removable sleeve surrounds and protects the fiber optic pairs and fiber optic couplers, and said sealing means and seating surfaces block moisture and other contaminants from said windows when said removable sleeve is attached to the cylindrical body, and whereby said fiber optic pairs and couplers are exposed when said removable sleeve and said sealing means are removed from said cylindrical body.

2. The fiber optic connector backshell of claim 1 wherein said windows provide at least 240° of open space around the cylindrical body.

3. The fiber optic connector backshell of claim 2 wherein said windows are equally spaced around the circumference of the cylindrical body.

4. The fiber optic connector backshell of claim 1 further comprising:

strain relief means for isolating cable stress from said fiber optic pairs and said fiber optic couplers, said frame comprising the strain relief means.

* * * * *